US006244464B1

(12) United States Patent
Goserud

(10) Patent No.: US 6,244,464 B1
(45) Date of Patent: Jun. 12, 2001

(54) PAPER CLIP DISPENSER

(76) Inventor: J. Thomas Goserud, 3152 Woodridge Dr., Landisville, PA (US) 17538-1347

( * ) Notice: Subject to any disclaimer, the term of this patent is extended or adjusted under 35 U.S.C. 154(b) by 0 days.

(21) Appl. No.: 09/626,771

(22) Filed: Jul. 27, 2000

(51) Int. Cl.[7] ........................................................ B23Q 7/04
(52) U.S. Cl. ............................................ 221/155; 221/212
(58) Field of Search .................................... 221/212, 210, 221/155

(56) References Cited

U.S. PATENT DOCUMENTS

| | | | | |
|---|---|---|---|---|
| D. 401,149 | * | 11/1998 | Goserud | D9/439 |
| D. 409,486 | | 5/1999 | Goserud . | |
| 3,750,868 | * | 8/1973 | Cooper | 221/212 X |
| 4,058,209 | * | 11/1977 | Schmidt | 221/212 X |
| 5,251,783 | * | 10/1993 | Gringer | 221/155 X |
| 5,351,858 | * | 10/1994 | Bar-Yona et al. | 221/155 X |

FOREIGN PATENT DOCUMENTS

| | | | | |
|---|---|---|---|---|
| 338656 | * | 11/1930 | (GB) | 221/212 |

* cited by examiner

*Primary Examiner*—David H. Bollinger
(74) *Attorney, Agent, or Firm*—Norman B. Rainer

(57) ABSTRACT

Apparatus for storing and conveniently dispensing paper clips includes a container having a flat bottom extremity and a circular upper aperture. A golf ball is rotatively seated in the aperture. A stem in the form of a golf tee is attached to the golf ball, and extends downwardly into contact with paper clips stored within the container. A magnet associated with the lowermost, distal extremity of the stem attracts and holds several paper clips. The paper clips are dispensed merely by lifting the golf ball with the magnetically attached paper clips.

14 Claims, 2 Drawing Sheets

PAPER CLIP DISPENSER

BACKGROUND OF THE INVENTION

1. Field of the Invention

This invention relates to apparatus for storing and dispensing paper clips, and more particularly concerns a paper clip dispenser suitable for desk top use and having a visually distinctive golf motif appearance.

2. Description of the Prior Art

Paper clips are universally employed in office and home environments for securing multiple pages of paper. The paper clips are usually stored as a random array in a cup or in an area of a compartmented drawer organizer unit. In most business offices, desk top space is a valued commodity, and is carefully apportioned with respect to functional needs and appearance factors. Such appearance factors relate to objects which are pleasing to the desk user, who spends considerable time confronted by things on the desk, and objects which may be appealing to a visitor or which may stimulate conversation by the visitor.

A container useful for storing paper clips, and having ornamental features involving a golf ball, is disclosed in U.S. Design Pat. No. 409,486. However, removal of paper clips from said container is difficult because of the narrow opening of its closure means. In order to remove paper clips from said container, the closure means must be removed, and the paper clips poured out. Such manner of dispensing paper clips is inconvenient and time-consuming.

It is accordingly an object of the present invention to provide apparatus for storing and conveniently dispensing metal paper clips.

It is another object of this invention to provide apparatus as in the foregoing object whose functionality incorporates a distinctive appearance.

It is a further object of the present invention to provide apparatus of the aforesaid nature wherein said distinctive appearance includes gripping means in the form of a golf ball.

It is a still further object of this invention to provide apparatus of the aforesaid nature of simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by apparatus for storing and conveniently dispensing small metal objects such as paper clips, said apparatus comprising:

a) container means having a flat bottom extremity, upper closure means and a circular upper opening, b) a golf ball seated by gravity effect within said opening as a component of said upper closure means, c) an elongated stem attached to said golf ball and extending downwardly into said container, said stem having a wide upper extremity which engages said golf ball, and a lower extremity which is narrower than said upper extremity, and d) magnet means associated with said lower extremity, said magnet means having sufficient magnetic strength to attract and secure several paper clips, permitting the removal of said paper clips from said container means by the lifting of said golf ball.

In a preferred embodiment, said stem has the appearance of a golf tee.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
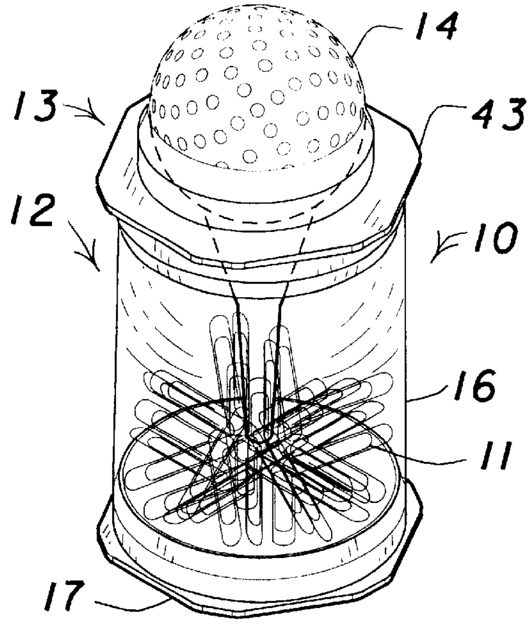
FIG. 1 is a perspective view of an embodiment of the apparatus of the present invention shown in functional relationship with metal paper clips.
Figure 2:
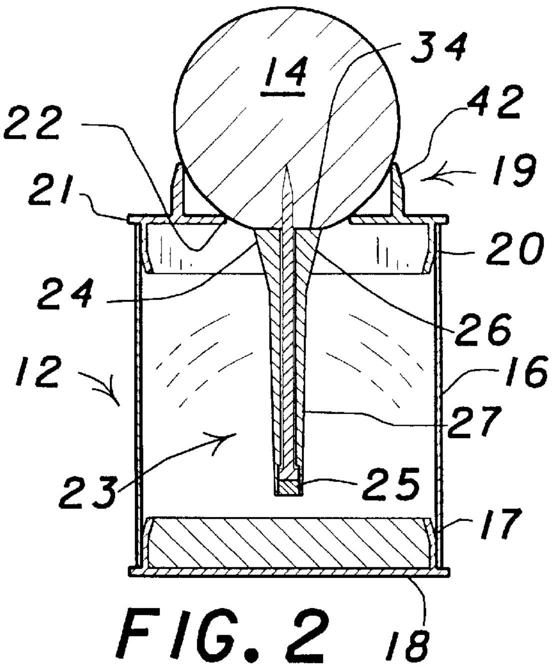
FIG. 2 is a vertical sectional view of the embodiment of FIG. 1.
Figure 3:
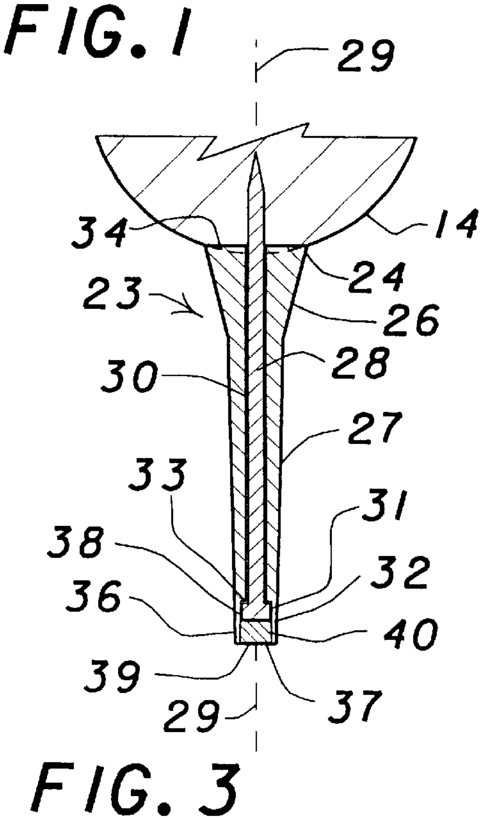
FIG. 3 is an enlarged fragmentary view of the apparatus of FIG. 2.

Referring now to FIGS. 1–3, an embodiment of the apparatus 10 of this invention for holding and dispensing small ferromagnetic objects such as metal paper clips 11 is shown comprised of container means 12 and upper closure means 13 having golf ball 14. The expression "golf ball" as employed herein is intended to denote either a standard regulation golf ball as employed in the game of golf or a replica thereof which is similar in outward appearance to said regulation golf ball.

Said container means is preferably of circular cylindrical construction, fabricated in part of plastic tube 16. Lower closure means in the form of lower plastic end cap 17 causes said container to effectively have a flat bottom extremity 18. Said tubular plastic may be fabricated of transparent plastic compositions such as plasticized polyvinyl chloride or polyacrylate.

Upper closure means 13 may be comprised in part of an upper plastic end cap 19 such as disclosed in U.S. Pat. No. 5,641,064 to J. Thomas Goserud, said cap having a collar portion 20 which frictionally engages the interior of tube 16, an outwardly directed flange 21 adapted to abut against the upper extremity of said tube, and centered circular aperture 22. The diameter of aperture 22 is smaller than the diameter of golf ball 14, whose standard diameter is approximately 42 millimeters, thereby enabling said golf ball to seat upon aperture 22 as a component of upper closure means 13.

The diameter of aperture 22 is preferably such as to enable 20% to 40% of the diameter of the golf ball to extend below flange 21, thereby achieving good seating of the golf ball without obscuring its appearance. Accordingly, the diameter of said aperture should preferably be between 35 and 38 millimeters.

Figure 4:
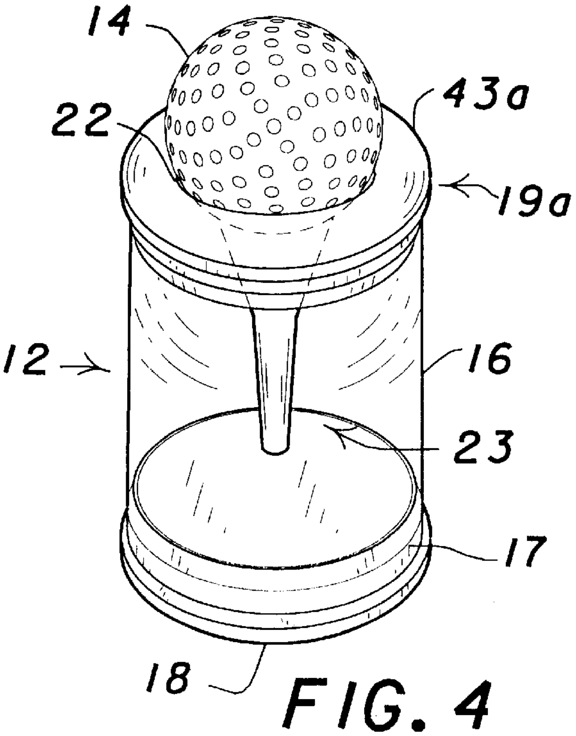
FIG. 4 is a perspective view of an alternative embodiment of the apparatus of the present invention.
Figure 5:
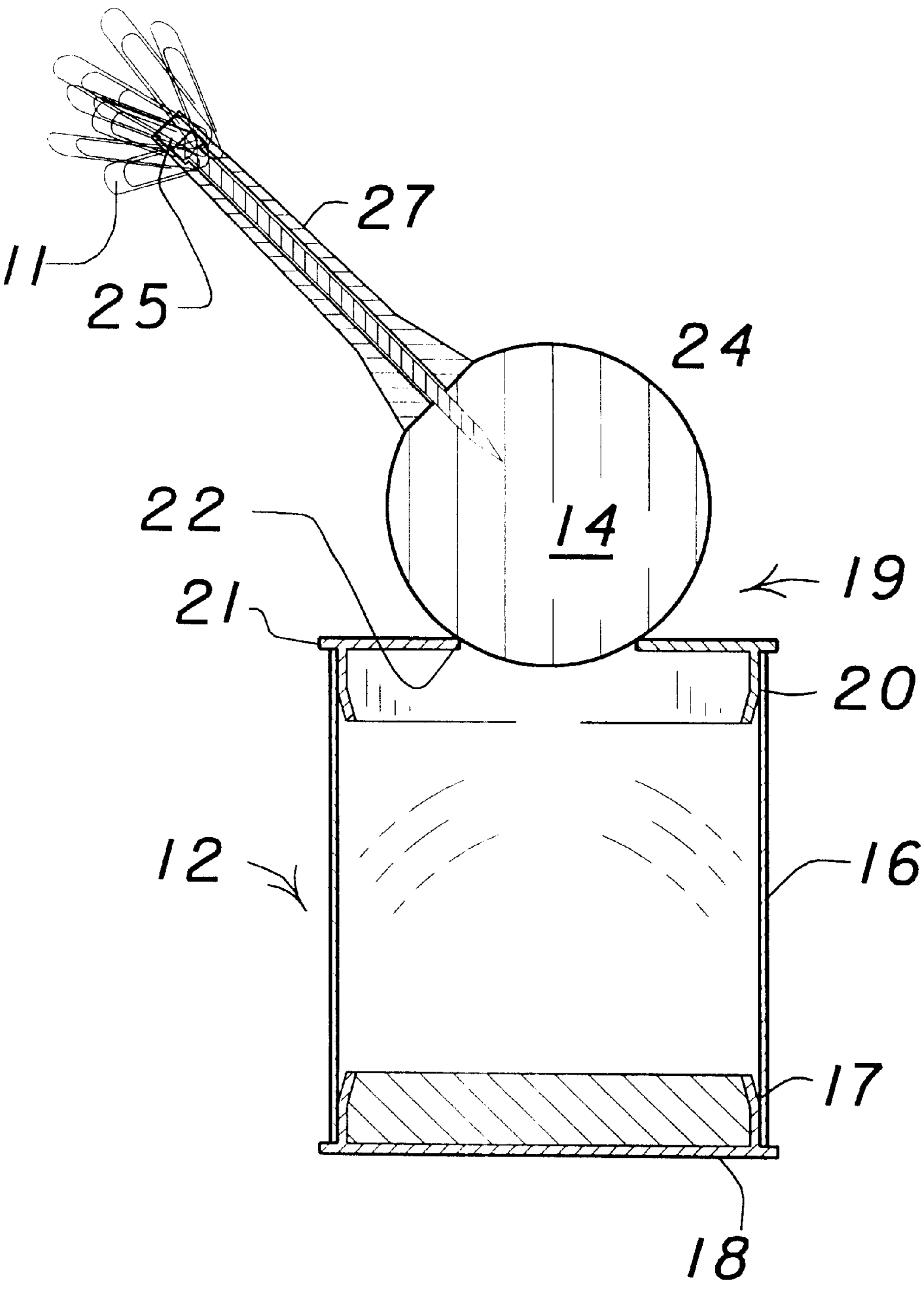
FIG. 5 shows the embodiment of FIG. 4 in a different mode of use.

In the embodiment shown in FIGS. 1 and 2, a retaining sleeve 42 extends upwardly from flange 21 into embracing engagement of the golf ball. Said sleeve, which extends 10% to 25% of the diameter of the golf ball above flange 21, facilitates stable orientation of the golf ball with respect to any ornamental indicia disposed thereupon. The outer perimeter 43 of flange 21 is shown in the embodiment of FIG. 1 to have a polygonal configuration. Other configurations however, are also contemplated, particularly the circular perimeter 43a in the alternative embodiment shown in FIG. 4. Also shown in FIGS. 4 and 5 is a plastic end cap 19*a* devoid of retaining sleeve 42. Said upper and lower plastic end caps, 19 and 17, respectively may be removably associated with tube 16, and may each be of monolithic or multi-component construction.

An elongated stem 23, fabricated of metal or plastic as a monolithic structure, is attached to said golf ball, and extends upon a straight axis of symmetry 29 downwardly into said container. Said stem has a wide upper extremity 24 which engages the golf ball, and a distal extremity 25 which is narrower than said upper extremity. Stem 23 preferably has the form of a standard golf tee having a convexly contoured circular upper surface 34 at said upper extremity, a sharply tapered upper portion 26, and moderately or non-tapered lower portion 27. Typically, stem 23, when having a golf tee configuration, will have a length between about 20 and 40 millimeters, and the diameter of upper surface 34 will be between about 10 and 15 millimeters. The specialized size and configuration of stem 23 further serves to prevent the golf ball from falling off upper end cap 19.

Stem 23 is preferably attached to the golf ball by way of a screw 28 which extends through an internal bore 30 centered upon axis 29. As best seen in FIG. 3, the exemplified embodiment of screw 28 has a flat head 31 adapted to fit within recess 32 in distal extremity 25, and interact with abutment shoulder 33 within said recess.

The length of screw 28 is such as to enable at least ¼ inch length of the screw to penetrate golf ball 14 seated upon convex upper surface 34 of stem 23 when the head 31 of said screw abuts shoulder 33.

In the exemplified embodiment, the depth of recess 32 and the thickness of head 31 of said screw are selected such that, when said screw engages the golf ball, and head 31 abuts shoulder 33, a downwardly opening compartment 36 is defined at the distal extremity 25 of stem 23. Said compartment will typically have a circular diameter between 3 and 5 mm. and a depth between about 1 and 3 mm.

A magnet 37, having a shape defined by substantially flat upper and lower surfaces 38 and 39, and circular cylindrical sidewall 40, is disposed within compartment 36 in close-fitting engagement therewith and is secured in place by virtue of its attraction to metal screw 28. Adhesive means may also be employed to secure said magnet within compartment 36. Magnet 37 is preferably of neodymium/iron/boron or samarium/cobalt type, available from the Edmund Scientific Company of Barrington, N.J. The magnetic force of magnet 37 is greater than 6000 Gauss, and is capable of suspending between 3 and 10 metal paper clips, each paper clip having a weight between 100 and 300 milligrams.

In an alternative embodiment of the apparatus of the present invention, stem 23 may be attached to said golf ball by adhesive means interactive between upper surface 34 and the golf ball, instead of the aforesaid attachment mode employing screw 28. In a still further alternative embodiment, stem 23 may be attached by magnetic means to the golf ball employing a magnet recessed into the surface of the golf ball and interactive with another magnet or magnetically attracted substrate associated with said upper surface 34. In said latter alternative embodiment, the magnet recessed into the golf ball may in itself be employed in conjunction with certain configurations of container means 12 to attract paper clips, even without the presence of stem 23 and its associated magnet 37.

In using the apparatus of this invention, metal paper clips are stored within container means 12. The golf ball is caused to seat within aperture 22 in a manner which disposes stem 23 downwardly into said container means. The paper clips become attached and held to the lower portion of said stem by virtue of the effect of said magnet. When the golf ball is raised upwardly away from the container means, the paper clips which cling to said stem are easily removed by the user.

In an alternative manner of use, as shown in FIG. 5, the golf ball may be positioned in an inverted manner wherein stem 23 is upwardly directed. In such mode of use, small objects fabricated of iron can be held by said stem for easy removal by the user. Said objects, which may include paper clips 11 or other fasteners or parts for assembly operations would be stored within container means 12, and periodically removed and dispensed by stem 23.

In said alternative manner of use, the magnetic tee facilitates pivoted rotation of the seated ball, thereby disposing distal extremity 25 of said stem, with attached objects, at a more convenient location for the user. Specialized indicia on the golf ball may be interactive with the pivoted orientation of the ball. When the magnetic tee is vertically upwardly oriented with just one or two paper clips attached, the device can provide amusement value because tapping of the device or the surface upon which it rests causes movement of the clips.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for storing and conveniently dispensing small metal objects such as paper clips, said apparatus comprising:

a) container means having a flat bottom extremity, upper closure means and a circular upper aperture, b) a golf ball seated by gravity effect within said aperture as a component of said upper closure means, c) an elongated stem attached to said golf ball and adapted to extend downwardly into said container, said stem having a wide upper extremity which engages said golf ball, and a distal extremity which is narrower than said upper extremity, and d) magnet means associated with said distal extremity, said magnet means having sufficient magnetic strength to attract and secure several paper clips, permitting the removal of said paper clips from said container means by the lifting of said golf ball.

2. The apparatus of claim 1 wherein said metal objects are paper clips.

3. The apparatus of claim 1 wherein said upper closure means is comprised in part of an upper end cap.

4. The apparatus of claim 3 wherein said circular aperture is centered within said upper end cap.

5. The apparatus of claim 4 wherein said container means is of circular cylindrical construction.

6. The apparatus of claim 5 wherein said container is comprised in part of a transparent plastic tube extending between upper and lower extremities.

7. The apparatus of claim 6 having a lower end cap which forms said flat bottom extremity.

8. The apparatus of claim 6 wherein said upper end cap is comprised of an outwardly directed flange adapted to abut against the upper extremity of said plastic tube.

9. The apparatus of claim 8 wherein the diameter of said aperture is such as to enable 20% to 40% of the diameter of said golf ball to extend below said flange.

10. The apparatus of claim 9 wherein the diameter of said aperture is between 35 and 38 millimeters.

11. The apparatus of claim 9 wherein said stem has a length between 20 and 40 millimeters.

12. The apparatus of claim 1 wherein said stem has the shape of a golf tee.

13. The apparatus of claim 1 wherein said magnet means is a magnet having a shape defined by substantially flat upper and lower surfaces and a circular cylindrical sidewall.

14. The apparatus of claim 13 wherein said magnet is housed within a downwardly opening compartment disposed at the distal extremity of said stem.

* * * * *